(12) United States Patent
Tufford et al.

(10) Patent No.: US 11,519,478 B2
(45) Date of Patent: Dec. 6, 2022

(54) VIBRATORY SCREEN APPARATUS

(71) Applicant: Superior Industries, Inc., Morris, MN (US)

(72) Inventors: Cody Tufford, Owosso, MI (US); Jarrod Felton, Morris, MN (US)

(73) Assignee: SUPERIOR INDUSTRIES, INC., Morris, MN (US)

(*) Notice: Subject to any disclaimer, the term of this patent is extended or adjusted under 35 U.S.C. 154(b) by 348 days.

(21) Appl. No.: 16/610,789

(22) PCT Filed: May 3, 2018

(86) PCT No.: PCT/US2018/030829
§ 371 (c)(1),
(2) Date: Nov. 4, 2019

(87) PCT Pub. No.: WO2018/204605
PCT Pub. Date: Nov. 8, 2018

(65) Prior Publication Data
US 2020/0063825 A1 Feb. 27, 2020

Related U.S. Application Data

(60) Provisional application No. 62/500,923, filed on May 3, 2017.

(51) Int. Cl.
*B07B 1/28* (2006.01)
*F16F 15/067* (2006.01)
*F16F 7/02* (2006.01)

(52) U.S. Cl.
CPC .............. *F16F 15/067* (2013.01); *F16F 7/02* (2013.01); *B07B 1/28* (2013.01)

(58) Field of Classification Search
CPC .............. F16F 15/067; F16F 7/02; B07B 1/28
USPC ........................................................ 209/365.3
See application file for complete search history.

(56) References Cited

U.S. PATENT DOCUMENTS

| | | | | |
|---|---|---|---|---|
| 5,505,482 A * | 4/1996 | VanDenberg | ........ | B62D 61/125 280/124.157 |
| 5,614,094 A * | 3/1997 | Deister | ..................... | B07B 1/46 210/392 |
| 5,992,809 A * | 11/1999 | Sweere | ................... | F16M 11/10 248/278.1 |
| 6,974,166 B2 * | 12/2005 | Ledford | ................... | B60R 19/56 293/118 |
| 7,380,760 B2 * | 6/2008 | Dittmer | ................... | F16M 13/02 248/278.1 |
| 2008/0258029 A1 * | 10/2008 | Zhang | ................ | F16M 11/2064 248/284.1 |

FOREIGN PATENT DOCUMENTS

CN 106166539 B * 3/2018
CN 208727993 U * 4/2019

* cited by examiner

*Primary Examiner* — Terrell H Matthews
(74) *Attorney, Agent, or Firm* — Larkin Hoffman Daly & Lindgren, Ltd.

(57) ABSTRACT

Vibratory screens and apparatus therefore are disclosed. In some embodiments, a damper is incorporated having a pin and pivot arm which cooperate to dampen high-amplitude vibratory motion of the screen. In some embodiments, a bumper is disposed transversely adjacent to a sidewall of the screen and mounted to a bracket supporting a damper. In some embodiments, one or more guards protect openings in a pivot arm of the damper.

19 Claims, 8 Drawing Sheets

VIBRATORY SCREEN APPARATUS

BACKGROUND

Vibratory classifiers such as vibratory screens (e.g., incline or horizontal screens) are used in some applications to classify materials such as aggregate materials (e.g., according to size and/or shape of the materials).

DESCRIPTION

Figure 1:
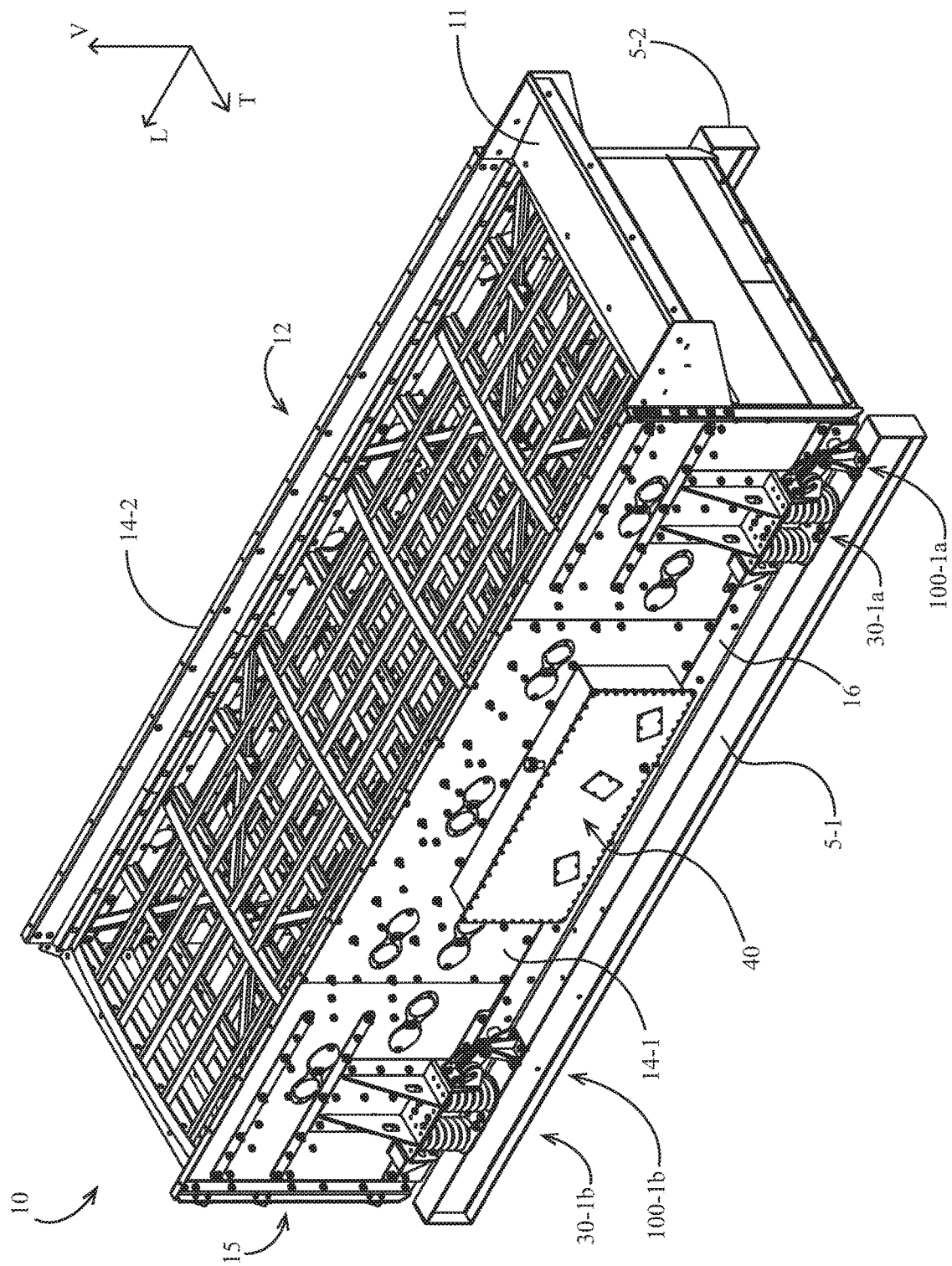
FIG. 1 is a perspective view of an embodiment of a vibratory screen.

Referring to the drawings, wherein like reference numerals designate identical or corresponding parts throughout the several views, FIG. 1 illustrates an embodiment of a vibratory screen 10 (e.g., a horizontal screen as illustrated, or an incline screen or other classifier according to other embodiments).

The screen 10 optionally includes one or more screen media (not shown) supported on deck arrangement 12. In various embodiments, the deck arrangement 12 includes one, two or three decks supporting screen media having various opening sizes for separating various material classifications. The decks of deck arrangement 12 are optionally supported by sidewalls 14-1, 14-2. The sidewalls 14-1, 14-2 are optionally resiliently supported by spring assemblies 30. In the illustrated embodiment, spring assemblies 30-1*a* and 30-1*b* support sidewall 14-1 and spring assemblies 30-2*a* and 30-2*b* (not shown) support sidewall 14-2. In other embodiments, different numbers, locations and configurations of spring assemblies are employed. The spring assemblies 30 are optionally supported on rails 5 or on other supporting structure; the rails 5 or other supporting structure may comprise part of a stationary or mobile frame or plant.

The screen 10 is optionally excited for vibrational movement (e.g., circular, elliptical, linear, etc.) by an exciter assembly 40 such as a set of rotating weights (not shown) which may be driven by a common motor. The rotating weights may be disposed laterally on both sides of the screen 10.

Figure 2:
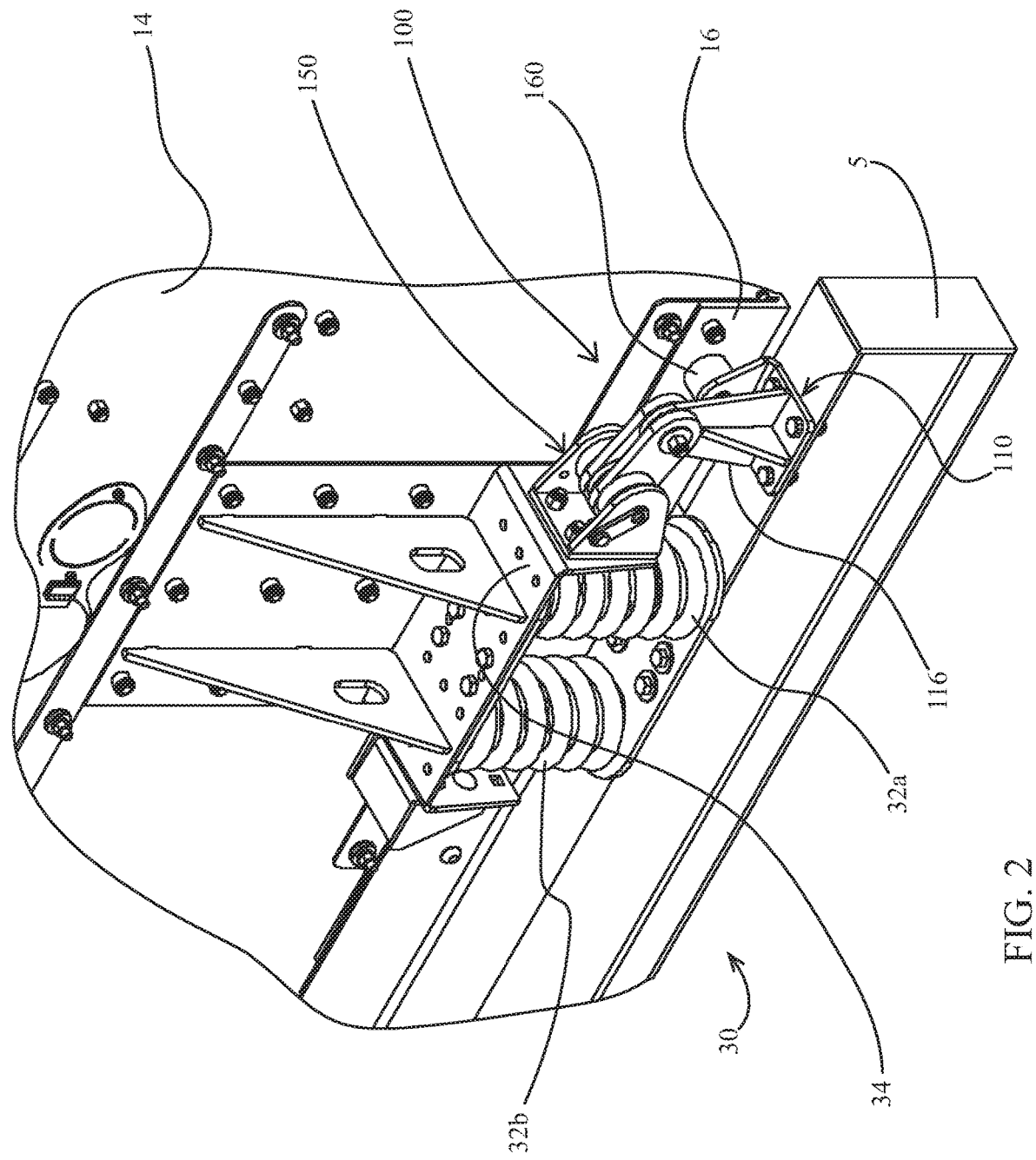
FIG. 2 is an expanded partial view of the vibratory screen of FIG. 1 illustrating an embodiment of a spring assembly and an embodiment of a damper assembly.

Referring to FIG. 2, each spring assembly optionally includes one or more springs (e.g., springs 32*a*, 32*b* such as coil springs). Each spring 32 may be disposed between a bracket 34 (e.g., a bracket mounted to sidewall 14 as illustrated) and the rail 5 or other support structure. The spring 32 may contact the bracket 34 (e.g., a generally horizontal surface thereof) at an upper end of the spring as illustrated.

In operation, as material is introduced to the top of the deck arrangement 12 (e.g., by depositing onto an inlet 11), the screen 10 optionally vibrates (e.g., in a generally circular motion, in a generally elliptical motion, linearly, etc.) such that material is advanced downward through the screen media and along the longitudinal direction L shown in FIG. 1 (e.g., extending from the inlet 11 to a terminal end 15 of the screen). The motion of the screen 10 may be generally in a plane defined by the vertical direction V and longitudinal direction L, although during operation some transverse (i.e., lateral) motion along direction T may take place.

Continuing to refer to FIG. 2, one or more damper assemblies 100 are optionally operably coupled to the screen 10 (e.g., the sidewall 14 and/or the bracket 34) and/or to the rail 5 or other support structure. A damper assembly 100 is optionally operably coupled to each bracket 34 or to other structure which may be adjacent to each spring assembly 30. In normal (e.g., relatively low amplitude) operation, the damper assembly 100 (which may be referred to in the art as a "snubber") optionally permits vibrational movement of the screen 10 relative to the support structure without interference. In relatively high amplitude operation (e.g., during startup or shutdown of the screen 10), the damper assembly 100 optionally dampens vibrational movement of the screen 10.

Figure 3:
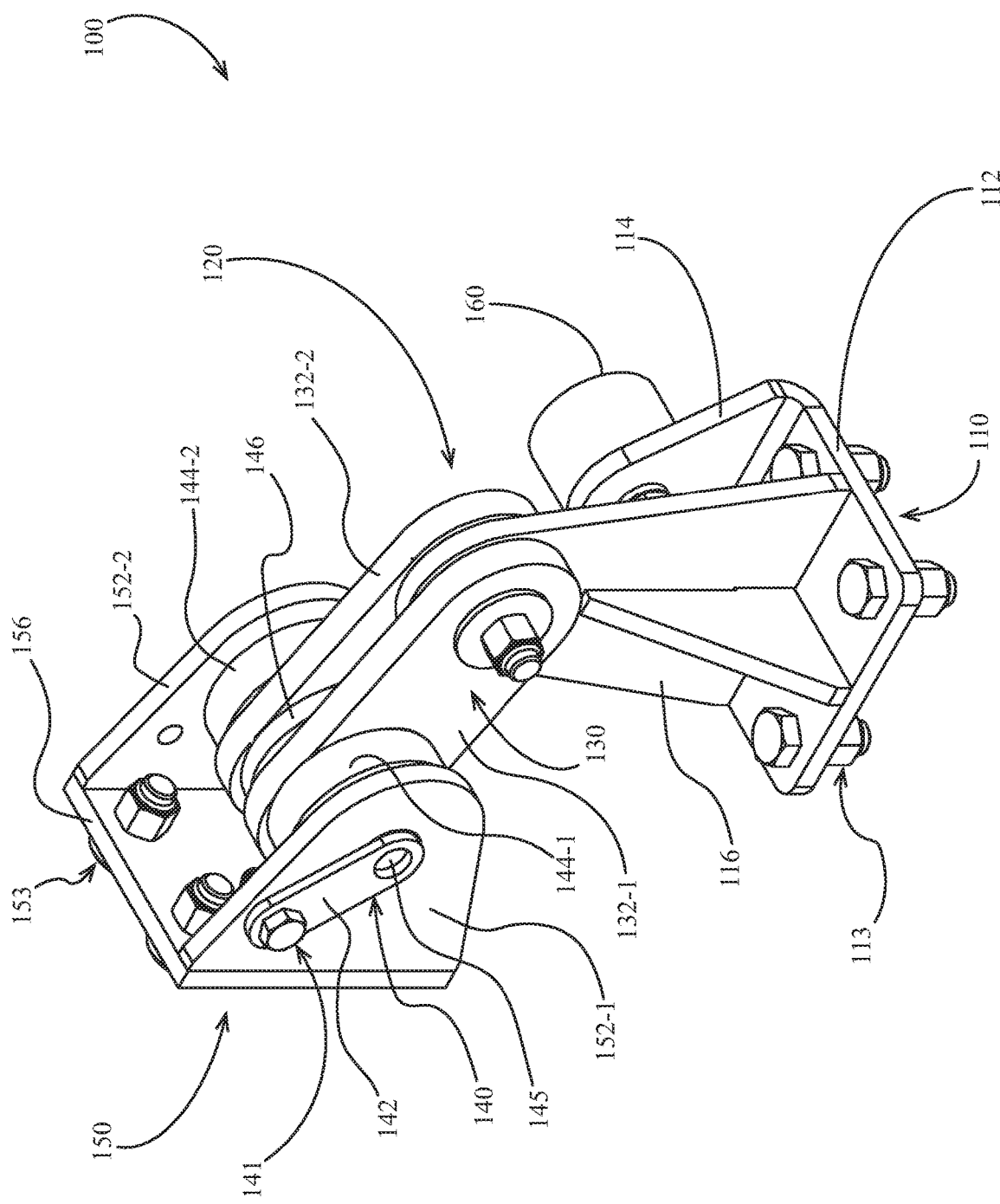
FIG. 3 is a perspective view of the damper assembly of FIG. 2.

Referring to FIG. 3, the damper assembly 100 optionally includes a bracket 150 which may be mounted to the bracket 34 (e.g., a vertical surface thereof). The damper assembly optionally includes a pivot arm 130. The pivot arm 130 is optionally pivotally coupled to bracket 110 (e.g., a vertically extending riser 116 thereof) at a pivot joint 120. The bracket 110 is optionally mounted to the rail 5 or other support structure.

Figure 4:
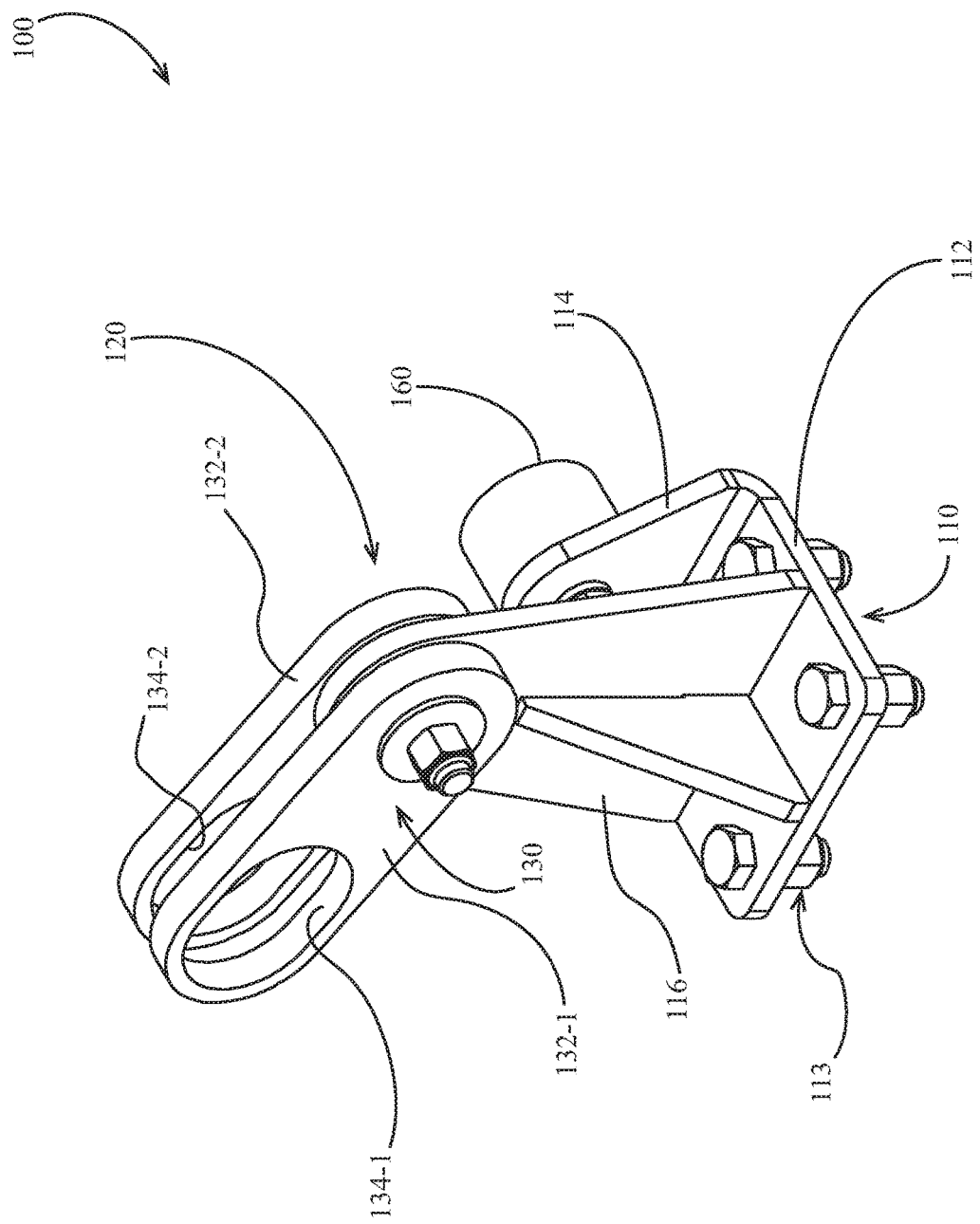
FIG. 4 is a perspective view of the damper assembly of FIG. 2 with certain components not shown for clarity.
Figure 5:
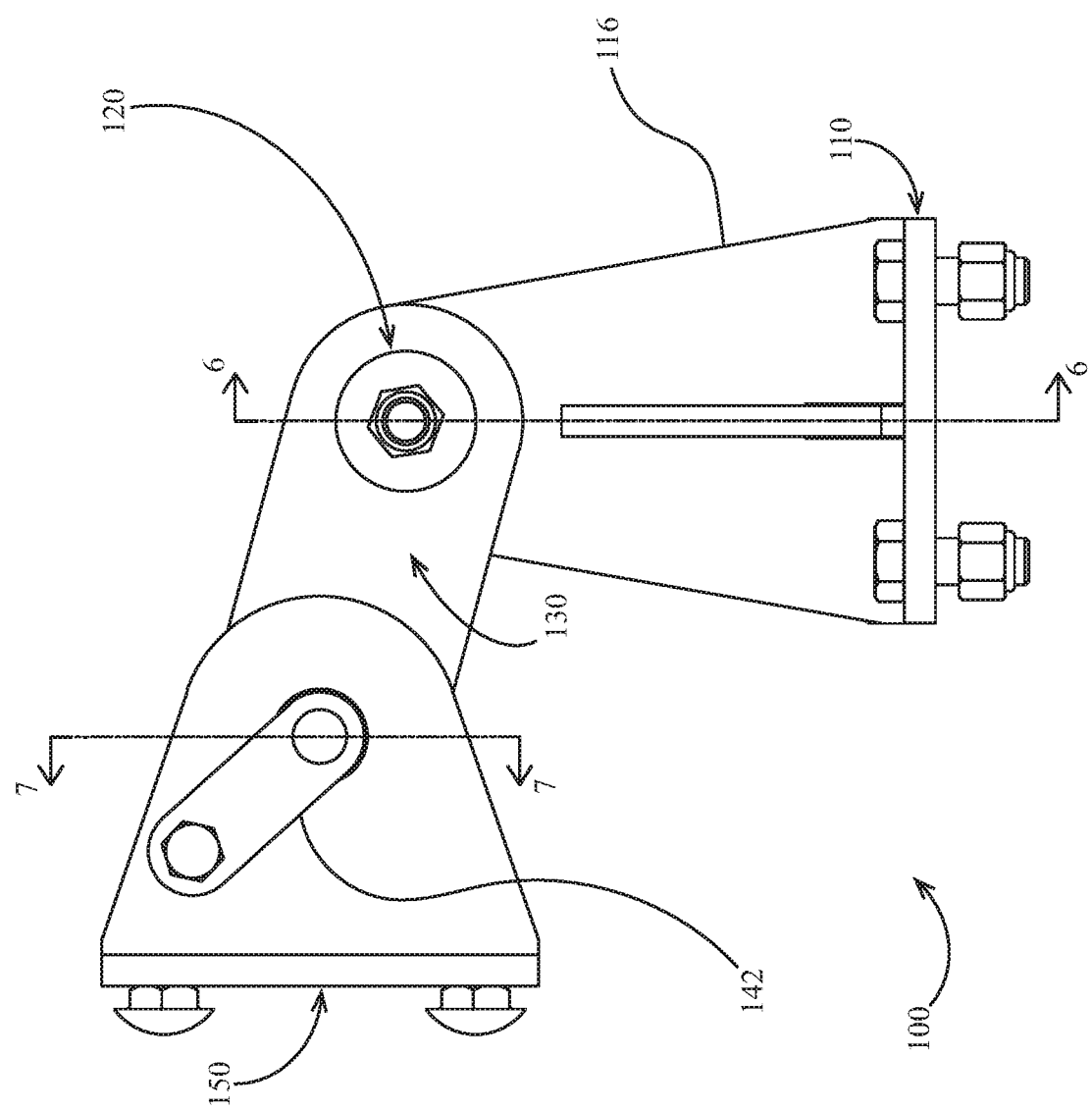
FIG. 5 is a side elevation view of the damper assembly of FIG. 2.

Referring to FIG. 4, the pivot arm 132 optionally includes one or more arms 132 (e.g., 132-1, 132-2) which are optionally pivotally coupled to the bracket 110 at joint 120. Each arm 132 optionally has an opening 134 therethrough. In various embodiments, the opening 134 is optionally elongated (e.g., elliptical) along the length of the pivot arm as illustrated but may have a circular, rectangular, or other profile.

Figure 7:
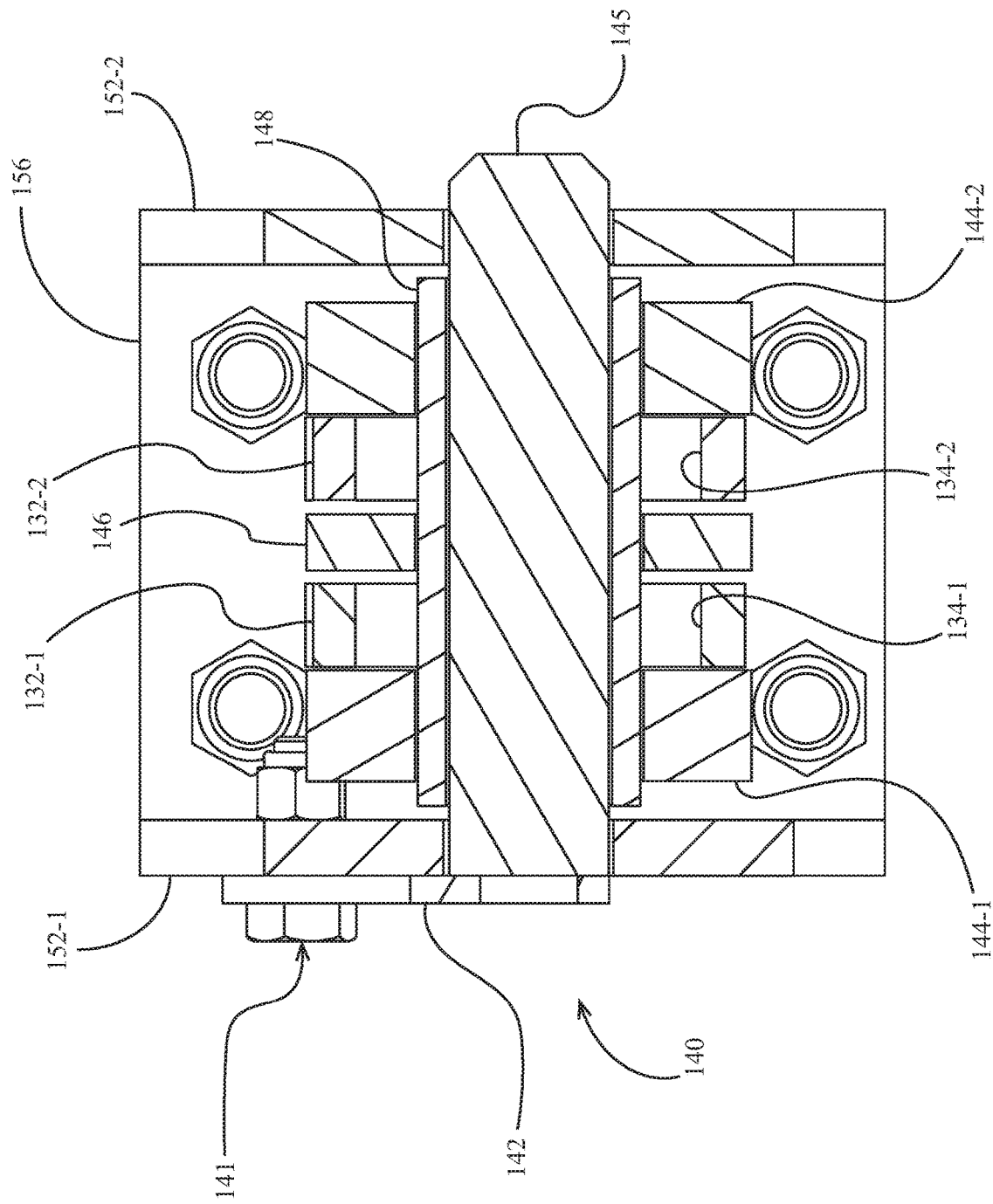
FIG. 7 is a sectional view along section 7-7 of FIG. 5.

Referring to FIG. 7, the damper assembly 100 optionally includes a pin assembly 140. The pin assembly optionally includes movement-limiting structure such as a pin 145 extending through one or more openings 134 of the pivot arm 132. In various embodiments, the pin 145 is of various shapes and cross-sections (e.g., cylindrical, square, rectangular, etc.) and may be replaced with other suitable movement-limiting structure which may be rigidly, resiliently or movably supported on the screen. In some embodiments, the pin 145 is mounted at opposing ends thereof to side plates 152 of the bracket 150. The side plates 152 may be mounted to and/or formed as a part with a mounting plate 156 of bracket 150. Mounting plate 156 is optionally mounted (e.g., removably mounted) to the bracket 34 (e.g., a vertically extending surface thereof), such as by one or more fasteners 153 (e.g., nut-and-bolt assemblies as illustrated). In some embodiments, a sleeve 148 is mounted to (e.g., slidingly received on or press fit onto) the pin 145. The sleeve 148 optionally contacts inner surfaces of opening 134 during high-amplitude vibrational motion of the screen 10 (e.g., during startup and/or shutdown of the exciter assembly 40). The sleeve 148 is optionally made of a wear-resistant material such as ultra-high molecular weight (UHMW) plastic. Relatively low-amplitude vibration of the screen 10 (e.g., during normal operation) does not result in contact between the pivot arm 130 and pin assembly 140 (e.g., due to the clearance between sleeve 148 and the inner surfaces of openings 134).

The pin 145 is optionally removably mounted to the bracket 150 by a fastener 141 (e.g., nut and bolt assembly). The fastener 141, in one embodiment, is not coaxial with the pin 145; for example, a link 142 extending radially from the central axis of the pin 145 may couple the fastener 141 to the pin. In some embodiments, the sleeve 148 is removable (e.g., slidingly removable) from the pin 145. In some embodiments, the pin extends at least partially through openings in the bracket 150 as illustrated. In an exemplary maintenance process, the pin assembly 140 may be removed by removing fastener 141 and sliding the pin 145 out of engagement with the bracket 150; after removal of the pin assembly 140, the sleeve 148 may be optionally removed and replaced before re-attaching the pin assembly to the bracket 150.

Continuing to refer to FIG. 7, in some embodiments one or more guards (e.g., annular guards) are disposed along the length of the pin 145. The guards are optionally coupled to (e.g., slidingly received on or press fit onto) the sleeve 148 and/or the pin 145. A first guard 146 is optionally disposed laterally between the arms 132-1, 132-2 of the pivot arm 130. Guards 144-1, 144-2 are optionally disposed at transversely opposing sides of the pivot arm 130. An outer dimension (e.g., chord length, diameter, etc.) of the guards 144, 146 is optionally greater than an inner dimension (e.g., chord length, diameter, etc.) of one or more of the openings 134.

Figure 6:
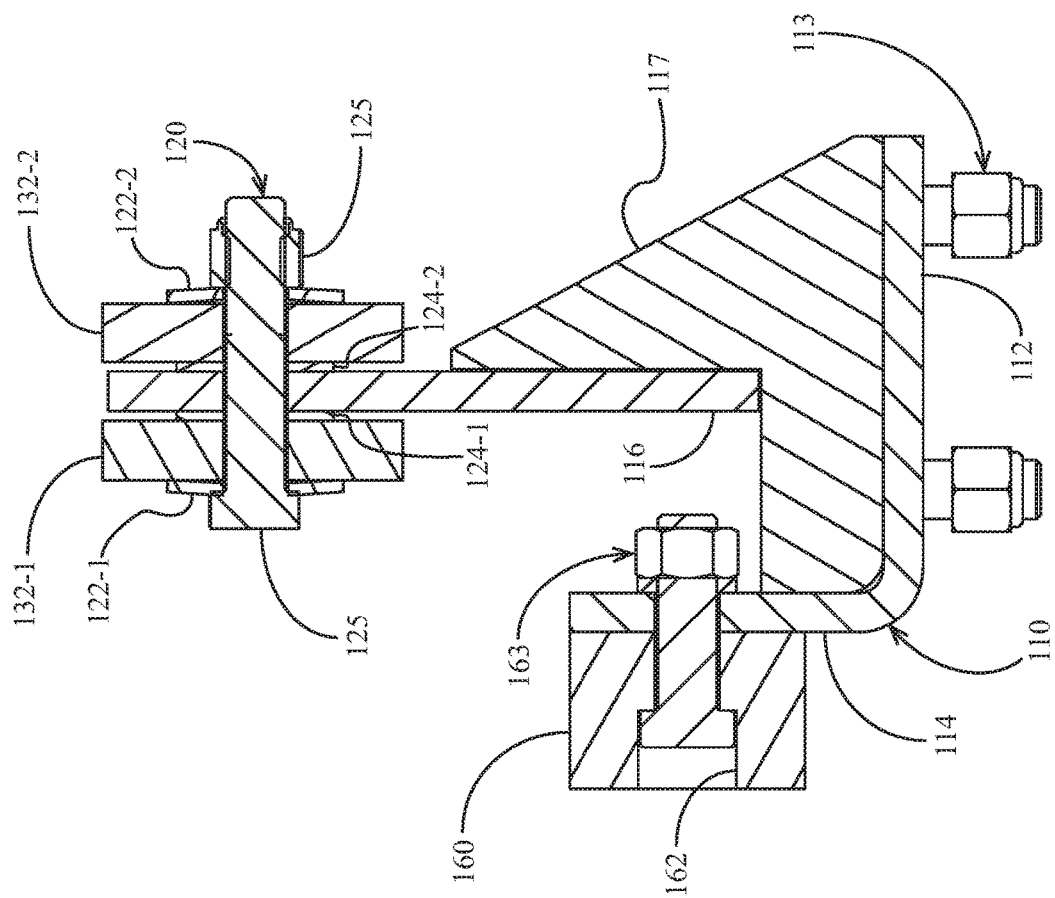
FIG. 6 is a sectional view along section 6-6 of FIG. 5.

Referring to FIG. 6, the joint 120 optionally frictionally resists (but depending on the imposed forces does not prevent) movement of the pivot arm 130 relative to the bracket 110. In some embodiments, the force of gravity is insufficient to overcome the frictional forces imposed on the pivot arm 130 such that the pivot arm 130 retains its position unless contacted by the pin assembly 140. In some embodiments, the joint 120 includes one or more washers 124 (e.g., brass or other metal washers, or plastic washers, etc.) disposed between the riser 116 and the arms 132. In some embodiments, the joint 120 includes a bolt 125 extending through one or more washers 122 (e.g., Belleville washers) and optionally extending through openings in the arms 132 and washers 124. Tightening bolt 125 and corresponding nut 126 optionally increases the frictional forces acting upon the arms 132 (e.g., by increasing the forces applied by the washers 122, 124 on each arm). When contacted by the pin assembly 140 (e.g., during high-amplitude vibratory motion of the screen 10), the frictional forces applied by joint 120 tend to resist displacement of the pivot arm 130 and thus resist movement of the pin assembly 140, bracket 150, and screen 10, and thus dampen the vibratory motion of the screen.

Continuing to refer to FIG. 6, the bracket 110 optionally includes a mounting plate 112 which is optionally mounted (e.g., by a fastener 113 such as a nut-and-bolt assembly) to the rail 5 or other supporting structure. A gusset 117 (or other support structure) is optionally coupled to both the mounting plate and the riser 116.

With reference to FIG. 6, in some embodiments the bracket 110 optionally operably supports a bumper 160 which is optionally made of UHMW or other material which may be wear-resistant and/or resilient. The bumper 160 is optionally mounted (e.g., removably mounted) to a lip 114 of the bracket 110. In the illustrated embodiment, the bumper 160 is removably mounted to lip 114 by a fastener 163 (e.g., nut-and-bolt assembly) which may extend at least partially into an opening 162 extending through the bumper 160. The bumper 160 is optionally generally cylindrical as illustrated but may have other shapes or profiles in various embodiments. The bumper 160 is optionally disposed adjacent to the sidewall 14 (and/or to a side plate 16 mounted to the sidewall 14) with a transversely extending gap therebetween. The gap is optionally sized such that normal transverse vibratory movement of the screen is allowed without contact resulting between bumper 160 and the screen 10 (e.g., sidewall or side plate). However, upon greater transverse vibratory movement, the screen 10 optionally contacts the bumper, thus dampening and/or restricting the transverse vibratory movement of the screen.

Figure 8:
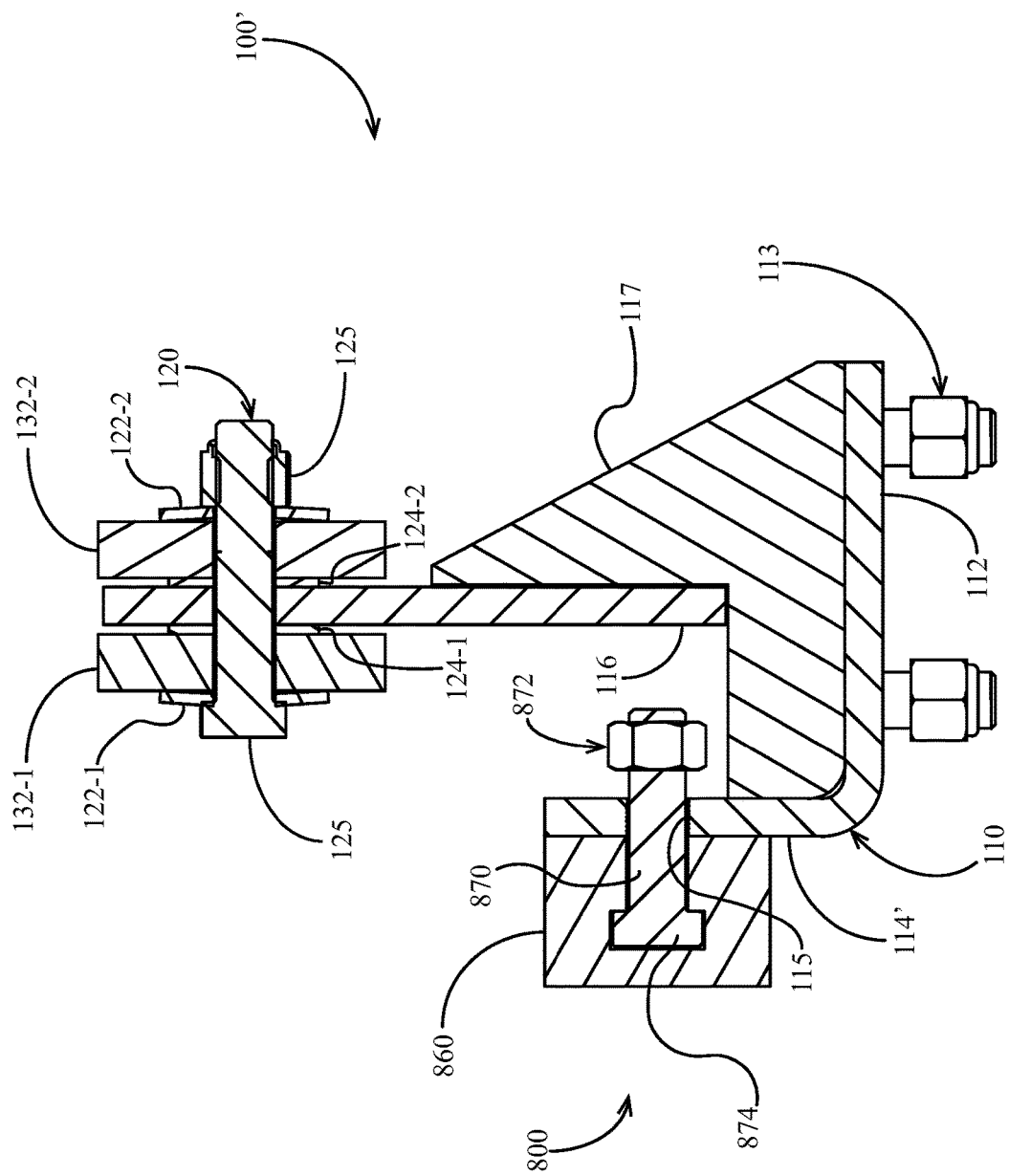
FIG. 8 is a sectional view of another embodiment of a damper assembly including an adjustable bumper.

An alternative bumper assembly 800 including a bumper 860 is illustrated in FIG. 8. In general, the bumper assembly 800 enables positional (e.g., transverse) adjustment of the bumper 860 relative to the sidewall 14 (e.g., to make a gap between the bumper and sidewall larger or smaller). In some embodiments, the bumper 860 is supported on a threaded rod 870. The threaded rod 870 is optionally received through a threaded opening 115 in a modified lip 114'. The position (e.g., lateral position) of the bumper 860 is optionally adjustable by advancing the threaded rod 870 (e.g., by turning a welded nut 872) through the opening 115. In some embodiments, a head 874 or other part of the threaded rod 870 is constrained to translate (e.g., laterally) with the bumper 860 such that advancement of the threaded rod toward or away from the sidewall 14 results in translation of the bumper 860 toward or away from the sidewall 14, respectively.

Headings used herein are simply for convenience of the reader and are not intended to be understood as limiting or used for any other purpose. Any ranges recited herein are intended to inclusively recite all values within the range provided in addition to the maximum and minimum range values.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A vibratory screen having a sidewall resiliently supported for vibrational movement on a stationary support by a spring assembly, the vibratory screen comprising:
 a damper assembly coupled with the vibratory screen, comprising: a first bracket, said first bracket being stationary with respect to said stationary support;
 a pivot arm pivotally coupled to said first bracket at a pivot joint, said pivot arm having an opening therethrough, wherein said pivot joint frictionally supports said pivot arm such that said pivot arm is stationary when said pin does not contact said pivot arm;
 and a pin extending through said opening, said pin being supported by a second bracket, said second bracket being supported by said sidewall, said pin being stationary with respect to said sidewall.

2. The damper assembly of claim 1, wherein said opening in said pivot arm is elliptical.

3. The damper assembly of claim 1, further comprising:
 a bumper supported on said bracket, said bumper being disposed adjacent to said sidewall, said bumper contacting said sidewall during operation.

4. The damper assembly of claim 1, further comprising:
 a wear-resistant sleeve supported on said pin.

5. The damper assembly of claim 1, wherein said opening is elongated.

6. The damper assembly of claim 1, wherein said pivot arm extends in a radial direction from said pivot joint, wherein said opening is elongated along said radial direction.

7. The damper assembly of claim 1, wherein said pivot arm comprises a first arm and a second arm.

8. The damper assembly of claim 7, further comprising:
a guard disposed between said first and second arm, said guard being supported on said pin.

9. The damper assembly of claim 1, further comprising:
a first guard disposed to a lateral side of said pivot arm, said guard being supported on said pin.

10. The damper assembly of claim 1, further comprising:
a bumper supported on said bracket, wherein a lateral position of said bumper relative to said sidewall is adjustable.

11. The damper assembly of claim 10, wherein said bumper is made of a wear-resistant material.

12. The damper assembly of claim 1, wherein the vibratory screen includes one or more springs compressed by a spring bracket, the spring bracket supported on the sidewall, wherein said second bracket is rigidly mounted to said spring bracket.

13. The damper assembly of claim 12, wherein said second bracket is rigidly mounted to a vertical surface of said spring bracket.

14. The damper assembly of claim 1, wherein said second bracket includes a side plate, and wherein said pin is mounted to said side plate.

15. The damper assembly of claim 14, wherein said pin has a central lateral axis, and wherein said pin is mounted to said side plate by a fastener, said fastener being offset from said central lateral axis of said pin.

16. A method of damping vibrations of a vibrating screen having a sidewall, said method comprising:
pivotally supporting a pivot arm on a bracket adjacent to the sidewall;
vibrating the vibrating screen within a first range of amplitudes; and
retaining the pivot arm in a first angular position relative to said bracket while vibrating the vibrating screen within said first range of amplitudes;
vibrating the vibrating screen at a relatively high amplitude greater than said first range of amplitudes;
deflecting said pivot arm while vibrating the vibrating screen at said relatively high amplitude; and
frictionally resisting deflection of said pivot arm such that vibration of said vibrating screen is dampened.

17. The method of claim 16, further comprising:
supporting a bumper on said bracket; and
contacting said sidewall with said bumper at least non-continuously while vibrating the vibrating screen.

18. The method of claim 17, further comprising:
vibrating a pin within an elongated opening in said pivot arm within said first range of amplitudes.

19. The method of claim 18, further comprising:
contacting an edge of said elongated opening with said pin at said relatively high amplitude.

* * * * *

UNITED STATES PATENT AND TRADEMARK OFFICE
CERTIFICATE OF CORRECTION

PATENT NO. : 11,519,478 B2
APPLICATION NO. : 16/610789
DATED : December 6, 2022
INVENTOR(S) : Cody Tufford and Jarrod Felton It is certified that error appears in the above-identified patent and that said Letters Patent is hereby corrected as shown below:

In the Claims

In Claim 16, Line 10, after "amplitudes;" delete "and".

Signed and Sealed this
Seventh Day of February, 2023

Katherine Kelly Vidal
*Director of the United States Patent and Trademark Office*